United States Patent [19]

Seita et al.

[11] Patent Number: 4,900,444

[45] Date of Patent: Feb. 13, 1990

[54] A POROUS MEMBRANE FOR BLOOD COMPONENTS AND METHOD FOR MANUFACTURING THEREOF

[75] Inventors: Yukio Seita; Makoto Onishi, both of Fuji, Japan

[73] Assignee: Terumo Corporation, Tokyo, Japan

[21] Appl. No.: 85,316

[22] Filed: Aug. 12, 1987

Related U.S. Application Data

[63] Continuation of Ser. No. 900,774, Aug. 26, 1986, abandoned.

[30] Foreign Application Priority Data

Aug. 29, 1985 [JP] Japan ................................ 60-188480

[51] Int. Cl.$^4$ ............................................. B01D 13/00
[52] U.S. Cl. ................................. 210/500.36; 264/41
[58] Field of Search ....................... 210/500.23, 500.36; 428/372, 376, 398; 264/41; 429/144

[56] References Cited

U.S. PATENT DOCUMENTS

| | | | |
|---|---|---|---|
| 3,401,798 | 9/1968 | Nyrop | 210/321 |
| 3,729,323 | 4/1973 | Grubb et al. | 117/11 |
| 3,830,733 | 8/1974 | Spivack et al. | 210/22 |
| 4,134,837 | 1/1979 | Yamashita et al. | 210/500 M |
| 4,197,148 | 4/1980 | Shinomura | 156/79 |
| 4,206,050 | 6/1980 | Walch et al. | 210/23 R |
| 4,298,666 | 11/1981 | Taskier | 429/144 X |
| 4,482,514 | 7/1981 | Schindler et al. | 264/41 |
| 4,539,256 | 9/1985 | Shipman | 428/315 J |
| 4,595,503 | 10/1985 | Schindler et al. | 210/500.38 |
| 4,613,441 | 9/1986 | Kohno et al. | 210/500.36 |
| 4,702,917 | 10/1987 | Schindler | 424/422 |
| 4,708,800 | 11/1987 | Ichikawa et al. | 210/500.36 X |
| 4,743,375 | 11/1987 | Seita et al. | 210/500.36 |

FOREIGN PATENT DOCUMENTS

| | | |
|---|---|---|
| 0045435 | 10/1982 | European Pat. Off. . |
| 0108601 | 5/1984 | European Pat. Off. . |
| 0183103 | 4/1986 | European Pat. Off. . |
| 57-20970 | 5/1982 | Japan . |
| 58-75555 | 5/1983 | Japan . |
| 1051320 | 12/1964 | United Kingdom . |
| 1078895 | 8/1967 | United Kingdom . |

OTHER PUBLICATIONS

The Pharmacopoeia of Japan 10th Edition, 1981, pp. 904–907.
EPO Search Report dated Jun. 1, 1988.
WO86/02282, published Apr. 24, 1986, Lopatin, et al.

*Primary Examiner*—Frank Spear
*Attorney, Agent, or Firm*—Cushman, Darby & Cushman

[57] ABSTRACT

A porous membrane for use in the separation of blood components, made of a polyolefin, having a wall thickness in the range of 10 to 500 μm, and possessing through holes having an average diameter of 0.01 to 5 μm at a porosity in the range of 10 to 85%, which porous membrane is characterized by exhibiting a shrinkage of not more than 6.0% in a heat treatment carried out at 121° C. for 120 minutes. A method for the manufacture of the porous membrane is also disclosed.

10 Claims, 1 Drawing Sheet

A POROUS MEMBRANE FOR BLOOD COMPONENTS AND METHOD FOR MANUFACTURING THEREOF

This is a continuation of application Ser. No. 900,774, filed Aug. 26, 1986, now abandoned.

BACKGROUND OF THE INVENTION

1. Field of the Invention

This invention relates to a porous membrane for the separation of blood components and to a method for the manufacture thereof. More particularly, this invention relates to a porous membrane which, as means for permeation useful for the separation of blood components, for example, has high thermal stability enough for the structure and the permeating property thereof to defy adverse effects of the hysteresis of the heat used as in sterilization and to a method for the manufacture thereof.

2. Description of Prior Art

As membranes for permeation intended for the separation of blood into the components, i.e. cells and plasma, various porous membranes have been adopted for actual use. These porous membranes must be subjected to a treatment for sterilization when they are put to use in such medical application.

Heretofore, as porous membranes of this nature, regenerated cellulose membrane, cellulose acetate membrane, polyvinyl alcohol membrane, polysulfone membrane, and polymethyl methacrylate membrane have been used. The macromolecular membranes of such materials are not only deficient in mechanical strength, pore diameter, and ability of plasma treatment but also defective in resistance to heat and dimensional stability at elevated temperatures and, therefore, withstand sterilization by autoclaving with great difficulty. They have been sterilized, therefore, preponderantly by the use of ethylene oxide gas or gamma ray. The sterilization by other method than the autoclaving method, however, entails the problem of toxicity of residual ethylene oxide gas, the problem of heavy consumption of time of treatment, or the problem of deterioration of resin by gamma ray.

A porous polyethylene hollow fiber membrane i.e. a porous hollow fiber membrane made of high-density polyethylene having a density of at least 0.955 g/cm$^3$, containing in the circumferential wall thereof numerous minute pores extending from the inner surface through the outer surface of the peripheral wall, oriented in the direction of length, and having a porosity of 30 to 90% has been proposed (Japanese Patent Laid-open SHO No. 58(1983)-75,555). This hollow fiber is produced by preparing a highly oriented crystalline unstretched hollow fiber, cold stretching this hollow fiber, and subsequently hot stretching the resulting stretched hollow fiber. Owing to this procedure, the minute pores are mechanically formed in the hollow fiber membrane. Moreover, these minute pores extend substantially straight from the inner surface through the outer surface of the peripheral wall and they possess a substantially uniform diameter. This hollow fiber membrane, therefore, is not allowed to acquire any large pore density per unit volume. As a natural consequence, the hollow fiber membrane inevitably acquires a small capacity for treatment per unit surface area. It is deficient in the performance proper for a membrane of permeation, as evinced by its susceptibility of breakage due to the stress of orientation. This hollow fiber membrane is a stretched membrane after all, although it is made of a polyolefin of high thermal stability. When it is exposed to the intense heat of the sterilization by autoclaving, therefore, it undergoes heavy shrinkage and suffers from heavy impairment of its properties as a membrane.

A permeable membrane produced by mixing a polymer such as crystalline polyolefin or polyamide which is stretchable and sparingly soluble in a solvent to be used with a compound partially compatible with the polymer and easily soluble in the solvent, molding the resultant mixture in the shape of a hollow fiber, treating the hollow fiber with the solvent, drying the wet hollow fiber, and stretching the dried hollow fiber monoaxially or biaxially by 50 to 1500% has been proposed (Japanese Patent Publication SHO No. 57(1982)-20,970). Since this membrane is stretched for the purpose of increasing the pore diameter, it possesses low mechanical strength and poor durability. Moreover since the pores on the two surfaces and inside the peripheral wall have a substantially uniform structure and the crystals of the polymer are coares, this membrane separates components of medium to high molecular weights with difficulty. It, therefore, exhibits poor performance for the sake of permeation. This membrane, on being sterilized by autoclaving, undergoes heavy thermal shrinkage.

An object of this invention, therefore, is to provide a novel porous membrane for separation of blood components and a method for the manufacture thereof. Another object of this invention is to provide a porous membrane excellent in thermal stability enough for the construction of membrane and the performance for permeation to defy the adverse effects of the hysteresis of the heat and, therefore, useful for the separation of blood components and a method for the manufacture thereof. Yet another object of this invention is to provide a method for the manufacture of a porous membrane, which method is capable of imparting to the porous membrane ample performance for permeation without subjecting the porous membrane to any additional stretching treatment.

SUMMARY OF THE INVENTION

The objects described above are accomplished by a porous membrane for the separation of blood components, made of a polyolefin, having a wall thickness in the range of 10 to 500 μm, and containing through holes having an average pore diameter of 0.01 to 5 μm at a porosity in the range of 10 to 85%, which porous membrane is characterized by exhibiting a thermal shrinkage of not more than 6.0% in a heat treatment at 121° C. for 20 minutes. For the present invention, the polyolefin is desired to be at least one member selected from the group consisting of polyethylene, polypropylene, and ethylene-propylene copolymers. The wall thickness is desired to be in the range of 20 to 300 μm. Further, the porosity is desired to be in the range of 30 to 80%. The average pore diameter is desired to be in the range of 0.02 to 3.0 μm. The thermal shrinkage mentioned above is desired to be not more than 3.0%. The porous membrane is desired to be a flat membrane.

The porous membrane mentioned above can be obtained by a method for the manufacture of a porous membrane for the separation of blood components, characterized by incorporating therein a step of mixing a polyolefin, an organic filler uniformly dispersible in the polyolefin under the conditions keeping the polymer in a molten state and easily soluble in an extractant, and a crystal seed-forming agent, discharging the resulting mixture in a molten state through a die, solidifying the discharged molten membrane by cooling, and forwarding the solidified membrane into contact with the extractant incapable of dissolving the polyolefin thereby depriving the membrane of the organic filler through extraction and a subsequent step of subjecting the produced polyolefin membrane in a fixed length to a heat treatment at a temperature 20° to 50° C. lower than the melting point of the polyolefin.

This invention also discloses a method for the manufacture of a porous membrane in the form of a flat web. This invention discloses a method for the manufcture of a porous membrane made of a polyolefin which is at least one member selected from the group consisting of polyethylene polypropylene and ethylene-propylene copolymers. Further, this invention discloses a method for the production of a porous membrane, wherein the organic filler is a hydrocarbon having a boiling point exceeding the melting point of the polyolefin. This invention discloses a method for the manufacture of a porous membrane, wherein the hydrocarbon is a liquid paraffin or an α-olefin oligomer. This invention also discloses a method for the manufacture of a porous membrane, wherein the amount of the organic filler to be used is in the range of 35 to 600 parts by weight based on 100 parts by weight of the polyolefin. This invention further discloses a method for the manufacture of a porous membrane, wherein the crystal seed-forming agent is an organic heat-resistant substance having a melting point of not less than 150° C. and a gel point exceeding the crystallization starting point of the olefin to be used. This invention also discloses a method for the manufacture of a porous membrane, wherein the amount of the crystal seedforming agent to be used is in the range of 0.1 to 5 parts by weight based on 100 parts by weight of the polyolefin. This invention further discloses a method for the manufacture of a porous membrane, wherein the extractant is composed of an alcohol and a halogenated hydrocarbon.

DESCRIPTION OF THE PREFERRED EMBODIMENT

Figure 1:
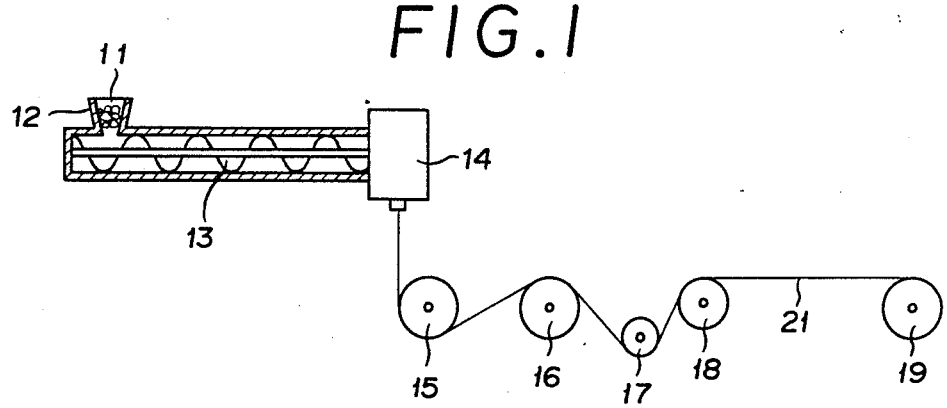
FIG. 1 is a schematic cross section of an apparatus to be used in the method for the manufacture of a porous membrane contemplated by this invention.

The porous membrane of the present invention for the separation of blood components is a porous membrane made of a polyolefin having a wall thickness in the range of 10 to 500 μm and containing through holes having an average diameter of 0.01 to 5 μm at a porosity in the range of 10 to 85%, which porous membrane is characterized by exhibiting a shrinkage of not more than 6.0% in a heat treatment performed at 121° C. for 20 minutes. The term "membrane for the separation of blood components" as used herein means a membrane to be used for separating blood into blood cells and blood plasma and further for separating the blood plasma into high molecular substances and other substances.

The porous membrane of this invention has a wall thickness in the range of 10 to 500 μm. If the wall thickness is less than 10 μm, the membrane has insufficient strength and is liable to produce pinholes therein. If the wall thickness exceeds 500 μm, the finished product incorporating this porous membrane constitutes itself a very large module lacking practicability. Preferably, the wall thickness is desired to be in the range of 20 to 300 μm. Further, the porous membrane of this invention possesses a porosity in the range of 10 to 85%. If the porosity is less than 10%, the porous membrane fails to acquire any sufficient capacity for permeation. If the porosity exceeds 85%, the porous membrane possesses insufficient strength and tends to form pinholes therein. Preferably, the porosity is in the range of 30 to 80%. The method for the determination of this porosity and the formula for the calculation thereof will be described afterward. Further, the porous membrane of this invention possesses through holes having an average diameter of 0.01 to 5 μm. By the presence of these through holes, the porous membrane is enabled to provide desired separation of blood components. The average diameter of the pores are desired to be varied to suit the substances present in the blood components. If the average pore diameter is less than 0.01 μm, the porous membrane does not permit permeation of such useful low molecular substances as albumin. If it exceeds 5 μm, the porous membrane suffers from undesired permeation of blood cells.

The porous membrane of the present invention exhibits a shrinkage of not more than 6.0% in a heat treatment performed at 121° C. for 20 minutes. The porous membrane of this invention acquires excellent properties as a membrane for the separation of blood components when it possesses the construction described above.

The heat treatment performed at 121° C. for 20 minutes represents a treatment for sterilization with high-pressure steam prescribed by the Japanese Pharmacopoeia. The term "shrinkage" as used herein designates the degree of change of the porous membrane before and after the heat treatment. When the porous membrane is in the form of a flat web, the change of the length of the porous membrane in the axial direction of molding and that of the length of the porous membrane in the direction perpendicular to the axial direction of molding after the heat treatment are both required to be not more than 6.0%. When the porous membrane is in the form of a hollow fiber membrane, the change of the length of the hollow fiber membrane in the axial direction of fiber and that of the inside diameter of the hollow fiber membrane after the heat treamtment are both required to be not more than 6.0%. If the shrinkage exceeds 6.0%, the porous membrane exhibits an insufficient capacity for permeation of water and fails to provide sufficient separation of blood components after the heat treatment. Preferably, the shrinkage is not more than 3.0%.

The porous membrane of this invention is made of a polyolefin. Examples of the polyolefin usable for this invention include polyethylene, polypropylene, and ethylenepropylene copolymers. One member or a mixture of two or more members selected from among the group of polyolefins mentioned above can be used. Among other polyolefins enumerated above, polypropylene proves particularly desirable. Now the porous membrane of this invention and the method for manufacture thereof will be described in detail below.

The method of manufacture in accordance with this invention comprises mixing a heat-resistant polyolefin resin with an organic filler and a crystal seed-forming agent in a molten state, molding the resultant mixture by a suitable method, stripping from the resulting membrane the organic filler by extraction, and thereafter subjecting the membrane to a heat treatment at a temperature 20° to 50° C. lower than the melting point of the polyolefin. The salient characteristic of this method resides in the fact that during the heat treatment, the membrane is fixed in a prescribed length. The porous membrane produced as described above exhibits a shrinkage of not more than 6.0% in a heat treatment performed at 121° C. for 20 minutes, for example. The method mentioned above, therefore, is capable of producing a porous membrane of high thermal stability such that the structure of membrane will not be altered and the ability of the membrane to provide required permeation is affected minimally by the intense heat used for sterilization by autoclaving.

The polyolefins usable as the raw material in the present invention include polypropylene, polyethylene, and ethylene-propylene copolymers, for example. The polyolefin to be selected is desired to have a melt index (M.I.) in the range of 5 to 70. Preferably, the M.I. is in the range of 15 to 65. In the polyolefins cited above, polypropylene is the most desirable selection. In the various grades of polypropylene, those grades of polypropylene having high degrees of crystallinity prove more desirable than others. The crystallinity is the proportion of the weight of crystalline part to the total weight of the polypropylene and is determined in accordance with the data of X-ray diffraction, infrared absorption spectrum, and density. Generally, the vinyl type macromolecule, $-CH_2-CHR_n$, can assume any of the three steric structures depending on the position of the substitutent R. i.e. isotactic and syndiotactic structures possessing regularity and atactic structure lacking the regularity. The ease with which the polymer undergoes crystallization increases in proportion as the proportion of isotactic or syndiotactic structure in the polymer increases. This statement is true of polypropylene. To be specific, the crystallinity of polypropylene increases in proportion as the proportion of isotactic moiety of the polymer increases. The polypropylene for use in this invention, when defined in terms of tacticity, a criterion other than the crystallinity, is desired to have a tacticity of not less than 97%. The melting point of the polypropylene ranges roughly from 160° to 180° C., depending as on the degree of polymerization.

The organic filler is required to be uniformly dispersible in the polyolefin under the conditions keeping the polyolefin in a molten state and, at the same time, readily soluble in the extractant in the manner to be described afterward. Typical examples of the filler meeting the requirement are liquid paraffin (having a number-average molecular weight in the range of 100 to 2,000), a -olefin oligomers such as ethylene oligomer (having a number-average molecular weight in the range of 100 to 2,000), propylene oligomer (having a number-average molecular weight in the range of 100 to 2,000), and ethylene-propylene oligomer (having a number-average molecular weight in the range of 100 to 2,000), paraffin wax (having a number-average molecular weight in the range of 200 to 2,500), and various hydrocarbons. Among other fillers cited above, liquid paraffin proves particularly desirable.

The mixing ratio of the organic filler to the polyolefin is in the range of 35 to 600 parts by weight, preferably 50 to 500 parts by weight, based on 100 parts by weight of the polyolefin. If the amount of the organic filler is less than 35 parts by weight, the porous membrane to be produced does not acquire any sufficient ability for permeation. If this amount exceeds 600 parts by weight, the molten mixture of the component materials for the membrane has a low viscosity and possesses a poor film-forming property. The raw material for the membrane is prepared (formulated) by the premix method which comprises preparing a mixture of the component materials in a prescribed composition, melt blending the mixture in an extruder such as, a twin screw extruder, extruding the resulting blend, and then pelletizing the extruded mixture.

The crystal seed-forming agent to be incorporated in the raw material for the porous membrane of this invention is an organic heat-resistant substance exceeding 150° C., preferably falling in the range of 200° to 250° C. and a gel point exceeding the crystallization starting point of the polyolefin being used. The crystal seed-forming agent is incorporated in the raw material for the purpose of promoting a reduction of the particle diameter of the polyolefin and controlling the diameter of holes to be formed by the organic filler which is incoporated first in the preparation of the raw material and subsequently removed by extraction. Typical examples of the organic filler effectively usable herein for the purpose are 1,3,2,4-dibenzylidene sorbitol, 1,3,2,4-bis(p-methylbenzylidene)-sorbitol, 1,3,2,4-(p-ethylbenzylidene)-sorbitol, bis(4-t-butylphenyl) sodium phosphate, sodium benzoate, adipic acid, talc, kaolin and the like.

Generally, the crystal seed-forming agent is used for the purpose of enhancing the transparency of resin molded. In the present invention, however, the use of the crystal seed-forming agent serves the purpose of decreasing diameters of polyolefin particles to a point where the diameters of the pores formed in the membrane will not be regulated by the diameters of polyolefin particles and, as the result, enabling the voids to be formed by the organic filler when it is removed from the membrane by extraction to be controlled to a diameter which meets the purpose. The amount of the crystal seed-forming agent to be added is in the range of 0.1 to 5 parts by weight, preferably 0.2 to 1.0 parts by weight, based on 100 parts by weight of the polyolefin being used.

The mixture of the component materials prepared as described above is melted and blended by the use of an extruder such as a twin screw extruder at a temperature in the range of 160° to 250° C., preferably 180° to 230° C., and then extruded in the shape of a flat membrane as through a T die or in the shape of a hollow fiber through a die possessed of an annular spinning nozzle. The molten mixture so discharged is allowed to fall into contact with a cooling roll kept at a prescribed temperature by circulation of cold water or other cooling medium. Otherwise, this molten mixture is allowed to fall under its own weight into a cooling liquid such as, for example, cold water, a halogenated hydrocarbon, liquid paraffin, polyethylene glycol (e.g., average molecular weight 190–630), or polypropylene glycol (e.g., average molecular weight 2000–4000) to be molded in the form of a membrane. In this case, the cooling temperature is in the range of 10° to 100° C., preferably 20° to 80° C. If the cooling temperature is less than 10° C., the cooling speed is so high that the phase separation does not sufficiently proceed and the ability of the membrane for permeation is not sufficient. If the cooling temperature exceeds 100° C., the crystallization speed of the polyolefin is lowered so much that fusion and association of the minute individual polyolefin particles are promoted and the opening ratio of the membrane is lowered, with the possible result that highly susceptible of clogging.

The organic filler contained in the membranous blend is removed by extraction by the use of the extractant during or after the course of cooling.

As a extractant, any of the known extractants, which are incapable of dissolving the polyolefin forming the membrane and capable of extracting the organic filler can be used. Typical examples of the extractant include alcoholes such as methanol, ethanol, propanols, butanols, hexanols, octanols, and lauryl alcohol, and halogenated hydrocarbons such as 1,1,2-trichloro-1,2,2-trifluoroethane, trichlorofluoromethane, dichlorofluoromethane, and 1,1,2,2-tetrachloro-1,2-difluoroethane. Among other extractants enumerated above, halogenated hydrocarbons prove particularly desirable from the standpoint of ability to extract the organic filler. Especially, chlorofluorinated hydrocarbons are preferable from the standpoint of safety on human body.

The porous membrane obtained as described above is further subjected to a heat treatment designed to stabilize the structure of the membrane and the ability of the membrane for permeation. This heat treatment is carried out in the atmosphere of air, nitrogen, or carbon dioxide at a temperature 20° to 50° C. lower than the melting point of the polyolefin for a period in the range of 1 to 120 minutes, preferably 2 to 60 minutes. For this porous membrane to undergo the heat treatment mentioned above, it must be fixed in a prescribed length in advance of the heat treatment. As means of fixing the porous membrane in the prescribed length, a method which comprises cutting the membrane in the prescribed length and then clamping the opposite ends of the cut membrane in the longitudinal direction or in the lateral direction or in both directions and a method which comprises continuously nipping the opposite ends as with chain attachments instead of cutting the membrane in the prescribed length can be cited.

This fixation of the porous membrane in the prescribed length may be effected immediately before the membrane is subjected to the heat treatment. Otherwise, it may be made before the extraction of the organic filler so long as the membranous blend has already been solidified by cooling.

It is important that the method of this invention should substantially avoid exerting any external force such as stretching upon the membranous structure throughout the entire procedure of manufacture described above. If such external force as stretching is exerted on the membrane at all, then it produces persistent stress within the membrane and this stress, while the membrane is undergoing a heat treatment such as for sterilization in an autoclave, causes shrinkage of the membrane and entails a heavy alteration of the structure of membrane and the ability of membrane to provide permeation. It is, therefore, necessary that the heat treatment should be performed on the membrane which is kept fixed in the prescribed length and further that even when the membrane which has been solidified by cooling is taken up on a roll, for example, possible exertion of tension upon the membrane should be precluded to the fullest possible extent.

Manufacture of the porous membrane in the form of a flat web by the method of this invention is effected as illustrated in FIG. 1, for example. A mixture 11 of a polyolefin, an organic filler, and a crystal seed-forming agent is fed through a hopper 12 to a twin screw type extruder 13, there to be melted and blended. The molten mixture is then forwarded to a T die 14 to be discharged therethrough in the form of a flat web. The extruded flat web is subsequently brought into contact with a cooling roll 15 and thereby solidified. When necessary, the obtained membrane is brought into contact with another cooling roll 16 and feed rolls 17, 18 and taken up on a winding roll 19. The flat membrane 21 which has been cooled consequently and taken up on the winding roll 19 is cut into pieces of a prescribed length. The cut flat membrane is immersed in the bath of an extractant to strip from the membrane the organic filler by extraction, and optionally dried to be completed in the form of a flat porous membrane. The porous membrane obtained as described above is subjected, as fixed in the prescribed length, to a heat treatment, to be converted into a flat porous membrane excellent in dimensional stability.

Figure 2:
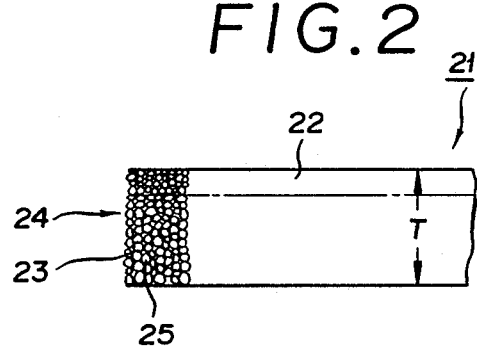
FIG. 2 is a model cross section of a porous membrane of the present invention.

The flat porous membrane which is finally obtained is a flat polyolefin membrane 21 which, as illustrated in a model diagram of FIG. 2, has a wall thickness T in the range of 10 to 500 $\mu$m, preferably 20 to 300 $\mu$m. On one surface side of the flat membrane 21, there is formed a dense layer 22 which consists of intimately bound minute polyolefin particles and contains minute pores. The pores have an average diameter in the range of 0.01 to 3 $\mu$m, preferably 0.02 to 1.0 $\mu$m. In the interior side of the flat membrane, there is formed an aggregate layer 24 which consists of numerous discrete minute particles of polyolefin 23 of an average diameter of 0.01 to 5.0 $\mu$m, preferably 0.02 to 3.0 $\mu$m, interconnected to one another and contains minute pores 25 labyrinthically communicating with one another. The thickness of the dense layer 22 does not exceed 30%, preferably falls in the range of 0.1 to 5%, of the total thickness of the membrane. This dense layer 22 is required to be present at all in the membrane and is desired to have as samll a thickness as possible. The surface on the opposite side from the side containing the dense layer 22, substantially similarly to the inner side, consists of fine polyolefin particles bound so as to contain therein minute pores of a relatively large average diameter (for example, 0.1 to 5 $\mu$m, preferably 0. 1 to 3 $\mu$m) as compared with the pores in the aforementioned dense layer 22.

Now, the present invention will be described more specifically below with reference to working examples. The numerical values of physical properties mentioned in the following working examples were the results of the determinations performed by the methods shown below.

(1) Thermal shrinkage

A circular membrane 156 mm in diameter was immersed in ethanol, with the deposited ethanol displaced with water. The circular membrane now in a state containing water was left standing in an autoclave at 121° C. for 20 minutes. The length of the membrane after this heat treatment was compared with the length thereof before the heat treatment and the difference (extent of shrinkage) was reported in percentage.

(2) Wall thickness of membrane

The thickness of a given membrane was actually measured with a micrometer.

(3) Porosity (P)

A flat porous membrane was immersed in ethanol, with the deposited ethanol displaced with water. The membrane now impregnated with water was weighed ($W_w$). The porosity (P) was calculated in accordance with the following formula, wherein $W_D$ stands for the weight of the membrane in a dry state and $\rho$ for the density of polymer in g/ml.

$$P = \frac{W_w - W_D}{(W_D/\rho) + (W_w - W_D)} \times 100 \, (\%)$$

(4) Average pore diameter (d)

A flat porous membrane was photographed through a scanning type electron microscope (produced by Japan Electron Optics Laboratory Co., Ltd. and marketed under trademark designation of JSM-50A or JSM-840) at 10,000 magnifications. The major diameters ($d_A$) and the minor diameters ($d_B$) of 100 pores showing on the photograph were measured and averaged.

$$d = \frac{\sum_{i=1}^{100} d(i)}{100} \left( di = \frac{d_A + d_B}{2} \right)$$

(5) Amount of water passed

Through a membrane having an available area of $1.38 \times 10^{-3}$ m$^2$, water was passed under pressure of 150 mmHg at 25° C. and the time required for 5 ml of water to pass through the membrane was clocked.

EXAMPLE 1

With a biaxial extruder (produced by Ikegai Iron Works, Ltd. and marketed under product code of "PCM-30"), 100 parts by weight of polypropylene having a melt flow index of 30, 130 parts by weight of liquid paraffin (having a number-average molecular weight of 324), and 0.3 part by weight of 1,3,2,4-bis(p-ethylbenzylidene) sorbitol as a crystal seed-forming agent were melted and mixed and then extruded. The extruded mixture was subsequently pelletized. With the same extruder, the pellets were melted at 150 to 200° C. The molten mixture was discharged into the ambient air through a T die having a slit width of 0.6 mm and an opening length of 280 mm at a rate of 100 g/min. The discharged web of mixture was allowed to fall into contact with a cooling roll installed below the T die and kept at a surface temperature of 35° C. to be solidified. The solidified web was taken up on a winding roll. The sheetlike web was cut into pieces of a prescribed length. A membrane thus obtained was fixed in the longitudinal and lateral directions and immersed twice, each for 10 minutes, in a bath of 1,1,2-trichloro-1,2,2-trifluoroethane at a bath temperature of 25° C. for removal of the liquid paraffin by extraction. Then, it was heated in the air at 135° C. for 2 minutes. The membrane was tested for the properties indicated above. The results are shown in Table 1. A sample membrane to be used for evaluation of permeability was treated with an aqueous 50% ethanol solution to be rendered hydrophilic and then washed with water.

EXAMPLE 2

A porous membrane was obtained by following the procedure of Example 1, except that the amount of liquid paraffin added was changed to 170 parts by weight. The properties of the membrane are shown in Table 1.

Control 1

A porous membrane was obtained by following the procedure of Example 2, except that the heat treatment performed on the membrane fixed in a prescribed length was omitted. The properties of the membrane are shown in Table 1.

Control 2

A permeable membrane made of polypropylene by the stretching method (produced by Polyplastic Co., Ltd. and marketed under trademark designation of "Duraguard 2500") was tested for the properties by following the procedure of Example 1. The results are shown in Table 1.

EXAMPLE 3

A porous membrane was obtained by following the procedure of Example 1, except that the temperature of the heat treatment was changed to 117° C. The properties of the membrane are shown in Table 1.

EXAMPLE 4

A porous membrane was obtained by following the procedure of Example 2, except that the temperature of the heat treatment was changed to 120° C. The properties of the membrane are shown in Table 1.

Control 3

A porous membrane was obtained by following the procedure of Example 1, except that the temperature of the heat treatment was changed to 100° C. The properties of the membrane are shown in Table 1.

EXAMPLE 5

With a biaxial exturder, 100 parts by weight of polypropylene having a melt flow index of 30, 170 parts by weight of liquid paraffin (having an average molecular weight of 324), and 0.3 part by weight of 1,3,2,4-dibenzylidene sorbitol as a crystal seed-forming agent were melted and extruded. The extruded mixture was then pelletized. With the same extruder, the pellets were melted at 150° to 200° C. The molten mixture was extruded into the ambient air through a T die having a slit width of 0.6 mm and an opening length of 280 mm at a rate of 100 g/min. The extruded web was allowed to fall into contact with a cooling roll installed below the T die and kept at a surface temperature of 34° C., there to be solidified. The resulting membrane was continuously introduced into a bath of 1,1,2-trichloro-1,2,2-trifluoroethane for removal of the liquid paraffin by extraction. The produced polypropylene membrane was fixed with the opposite ends continuously nipped with a 25-mm chain attachment and, in the fixed state, introduced into the air kept at 130° C. Then, it was continuously taken up at at rate of 6 m per minute. The properties of the membrane are shown in Table 1.

EXAMPLE 6

With a biaxial extruder, 100 parts by weight of polypropylene having a melt flow index (MI) of 30, 40 parts by weight of polypropylene having MI 0.5, 430 parts by weight of liquid paraffin (having an average molecular weight of 324), and 0.3 part by weight of 1,3,2,4dibenzylidene sorbitol as a crystal seed-forming agent were melted and extruded. The extruded mixture was then pelletized. With the same extruder, the pellets were melted at 135° to 180° C. The molten mixture was extruded into the ambient air through a T die having a slit width of 0.6 mm and an opening length of 280 mm at a rate of 200 g/min. The extruded web was allowed to fall into contact with a cooling roll installed below the T die and kept at a surface temperature of 55° C., there to be solidified. The resulting membrane was continuously introduced into a bath of 1,1,2-trichloro-1,2,2-trifluoroethane for removal of the organic filler by extraction. The produced polypropylene membrane was fixed with the opposite ends continuously nipped with a 25-mm chain attachment and, in the fixed state, introduced into the air kept at 130° C. Then, it was continuously taken up at at rate of 3.3 m per minute. The properties of the membrane are shown in Table 1.

TABLE 1

|  | Shrinkage by autoclaving (121° C., 120 min.) (%) | | Change of porosity | | Change of average pore diameter | | Amount of water passed (ml/hr.mmHg m²) | |
| --- | --- | --- | --- | --- | --- | --- | --- | --- |
|  | Axial direction of molding | Perpendicular to axial direction of molding | Porosity before autoclaving (%) | Porosity after autoclaving (%) | Diam. before autoclaving (%) | Diam. after autoclaving (%) | Amount before autoclaving | Amount after autoclaving |
| Example 1 | 0 | 0 | 40.6 | 40.1 | 0.20 | 0.20 | 330 | 333 |
| Example 2 | 0 | 0 | 42.1 | 41.9 | 0.25 | 0.25 | 610 | 607 |
| Control 1 | 14.1 | 14.1 | 42.5 | 21.4 | 0.25 | 0.20 | 610 | 205 |
| Control 2 | 19.9 | 7.1 | 46.3 | 36.5 | 0.22 | 0.26 | 360 | 430 |
| Example 3 | 5.6 | 2.3 | 40.3 | 39.5 | 0.19 | 0.18 | 335 | 329 |
| Example 4 | 2.7 | 2.6 | 43.3 | 42.8 | 0.26 | 0.25 | 618 | 610 |
| Control 3 | 10.4 | 5.4 | 40.5 | 30.8 | 0.20 | 0.16 | 328 | 159 |
| Example 5 | 1.6 | 2.0 | 43.0 | 42.7 | 0.25 | 0.25 | 840 | 831 |
| Example 6 | 0.8 | 0.3 | 66.9 | 66.6 | 1.25 | 1.23 | 17,000 | 16,940 |

It is noted from the results that the porous membranes according to this invention showed no change of size due to the heat for sterilization in an autoclave and, because of high thermal stability, retained their porosity, average pore diameter, and permeability to water intact, whereas the membrane of Control 1 showed a notable shrinkage after the sterilization in the autoclave, implying the possibility that the membrane, when incorporated in a finished product, would sustain a rupture along the sealed portion and would also suffer degradation of other properties on exposure to the intense heat used for the sterilization in the autoclave. The membrane of Controls 2, 3 similarly showed conspicuous shrinkage after the sterilization in the autoclave, implying that they would entail disadvantages similarly to the membrane of Control 1 and would have their other properties seriously impaired. From the results described above, it is inferred that the porous membrane produced by the conventional stretching method suffered a change of size by heat because the stretching performed during the course of molding produced internal stress in the membrane and this internal stress persisted in the membrane even after completion of the molding.

As described above, this invention is directed to a porous membrane for the separation of blood components, made of a polyolefin, having a wall thickness in the range of 10 to 500 μm, and possessing through holes having an average diameter of 0.01 to 5 μm at a porosity in the range of 10 to 85%, which porous membrane is characterized by exhibiting a shrinkage of not more than 6.0% in a heat treatment conducted at 121° C. for 20 minutes. The porous membrane, therefore, possesses a high ability for permeation and can be safely used in a device for the separation of blood components because it retains the structure of membrane and the ability of membrane to provide permeation substantially intact even on exposure to the heat of the sterilization in the autoclave. Further, this invention is directed to a method for the manufacture of a thermally stable porous membrane, which is characterized by incorporating a step of mixing a polyolefin, an organic filler uniformly dispersible in the polyolefin under the conditions keeping the polyolefin in a molten state and easily soluble in an extractant to be used afterward herein, and a crystal seed-forming agent, causing the resultant mixture to be discharged in a molten state through a die, solidifying the discharged web of mixture by cooling, and bringing the solidified web into contact with an extractant incapable of dissolving the aforementioned organic filler thereby removing the aforementioned organic filler through extraction, and a step of fixing the produced polyolefin membrane in a prescribed length and subjecting the membrane to a heat treatment 20° to 50° C. lower than the melting point of the polyolefin. The porous membrane thus obtained, therefore, possesses a high ability to provide permeation and enjoys high thermal stability enough for the structure of membrane and the ability of membrane to permit permeation to defy adverse effects of the hysteresis of heat. The method permits easy manufacture of a membrane which when used for the separation of blood components, retains the structure of membrane and the ability of membrane to provide permeation intact even on exposure to the heat of sterilization in an autoclave.

When the polyolefin is polyethylene, polypropylene, or ethylene-propylene copolymer, preferably polypropylene, organic filler is a hydrocarbon having a boiling point exceeding the melting point of the aforementioned polyolefin, preferably liquid paraffin or an α-olefin oligomer, the crystal seed-forming agent is an organic heat-resistant substance having a melting point of not less than 150° C. and a gel point exceeding the crystallization initiating point of the polyolefin, and the extractant is composed of an alcohol and a halogenated hydrocarbon, and further when the amounts of the organic filler and the crystal seed-forming agent to be added respectively fall in the range of 35 to 600 parts by weight and 0.1 to 5 parts by weight, based on 100 parts by weight of the polyolefin, the produced porous membrane all the more excel in thermal stability and ability to provide required permeation.

What is claimed is:

1. A method for manufacturing a porous membrane for use in the separation of blood components comprising:

mixing a molten polyolefin, an organic filler uniformly dispersible in said polyolefin while maintaining said polyolefin in a molten state and easily soluble in an extractant, and a crystal seed-forming agent which is an organic heat resistant substance having a melting point of not less than 150° C. and a gel point exceeding the crystallization initiating point of said polyolefin, causing the resultant mixture in the molten state to be discharged through a die whereby a molten membrane is obtained, solidifying the thus discharged molten membrane by cooling, separating said organic filler from the solidified membrane by contacting the solidified membrane with an extractant incapable of dissolving said polyolefin, said extractant stripping said organic filler from said membrane by extraction whereby the polyolefin membrane is obtained, and fixing the thus produced polyolefin membrane in a prescribed length and subjecting said fixed polyolefin membrane to a heat treatment at a temperature of 20° C. to 50° C. lower than the melting point of said polyolefin.

2. A method according to claim 1, wherein said porous membrane is a flat membrane.

3. A method according to claim 1, wherein said polyolefin is at least one member selected from the group consisting of polyethylene, polypropylene, and ethylenepropylene copolymers.

4. A method according to claim 1, wherein said organic filler is a hydrocarbon having a boiling point exceeding the melting point of said polyolefin.

5. A method according to claim 4, wherein said hydrocarbon is liquid paraffin or an α-olefin oligomer.

6. A method according to claim 4, wherein the amount of said organic filler to be used is in the range of 35 to 600 parts by weight, based on 100 parts by weight of said polyolefin.

7. A method according to claim 1, wherein the amount of said crystal seed-forming agent to be used is in the range of 0.1 to 5 parts by weight based on 100 parts by weight of said polyolefin.

8. A method according to claim 1, wherein said extractant is composed of an alcohol and a halogenated hydrocarbon.

9. The membrane produced by the process of claim 1.

10. A flat permeable membrane having a thickness of 10 to 500μm and having in one surface thereof as a filtering surface a compact layer formed from intimately bound fine polyolefin particles possessed of fine pores and in the interior and other surface thereof a layer formed of an aggregate of fine discreet polyolefin particles of an average diameter on the range of 0.01 to 5μm so adjoined so as form fine labyrinthically continuing through pores and which, therefor, establish communication between the surfaces of said membrane, obtained by:

mixing a polyolefin, an organic filler uniformly disbursed and said polyolefin in the molten state thereof, and a crystal seed-forming agent, discharging the resultant mixture in the molten state thereof through a die;

contacting one surface of the thus discharged molten membrane with a cooling roll thereby cooling and solidifying said membrane;

placing the cooled solidified flat membrane into contact with an extractant incapable of dissolving said polyolefin thereby extracting and removing said organic filler from the said membrane; and affixing said membrane into a prescribed length and maintaining said membrane in said condition while subjecting the thus formed membrane to a heat treatment at a temperature of 20° C. to 50° C. lower than the melting point of said polyolefin.

* * * * *